United States Patent
Xie et al.

(10) Patent No.: US 12,024,661 B2
(45) Date of Patent: Jul. 2, 2024

(54) SOLVENT-FREE AND LIGAND-FREE BALL MILLING METHOD FOR PREPARATION OF CESIUM LEAD TRIBROMIDE QUANTUM DOT

(71) Applicants: XI'AN UNIVERSITY OF ARCHITECTURE AND TECHNOLOGY, Xi'an (CN); DONGYING HADONG INDUSTRIAL TECHNOLOGY RESEARCH INSTITUTE CO., LTD., Dongying (CN)

(72) Inventors: Huidong Xie, Xi'an (CN); Wei Liu, Xi'an (CN); Zhiteng Wang, Xi'an (CN); Xiaoling Guo, Xi'an (CN); Chang Yang, Xi'an (CN); Guanli Liu, Dongying (CN)

(73) Assignees: XI'AN UNIVERSITY OF ARCHITECTURE AND TECHNOLOGY, Xi'An (CN); DONGYING HADONG INDUSTRIAL TECHNOLOGY RESEARCH INSTITUTE CO., LTD., Dongying (CN)

(*) Notice: Subject to any disclaimer, the term of this patent is extended or adjusted under 35 U.S.C. 154(b) by 0 days.

(21) Appl. No.: 17/893,065

(22) Filed: Aug. 22, 2022

(65) Prior Publication Data
US 2023/0220276 A1    Jul. 13, 2023

(30) Foreign Application Priority Data
Jan. 10, 2022    (CN) ......................... 202210022251.4

(51) Int. Cl.
    *C09K 11/66*      (2006.01)
    *C01G 21/00*      (2006.01)
    (Continued)

(52) U.S. Cl.
    CPC .......... *C09K 11/665* (2013.01); *C01G 21/006* (2013.01); *C08F 20/14* (2013.01);
    (Continued)

(58) Field of Classification Search
    CPC ......... C09K 11/665; C01G 21/16; C08K 3/16
    See application file for complete search history.

(56) References Cited

U.S. PATENT DOCUMENTS

2018/0355244 A1*   12/2018   Lüchinger .............. B82Y 30/00
2022/0195580 A1*   6/2022   Grenet ................... C30B 23/06

FOREIGN PATENT DOCUMENTS

CN     109354059 A      2/2019
CN     111808606 A   * 10/2020

* cited by examiner

*Primary Examiner* — Matthew E. Hoban
(74) *Attorney, Agent, or Firm* — Zhigang Ma

(57) ABSTRACT

A solvent-free and ligand-free ball milling method for preparation of cesium lead tribromide ($CsPbBr_3$) quantum dot is provided. First, mixing a Cs source, a Pb source, and a Br source as per a molar ratio of Cs source:Pb source:Br source is 1:1~6:1~9, and then adding polymethyl methacrylate (PMMA) to obtain a mixture. The mixture is milled for 1-2 hours at a rotation speed in a range of 360~630 revolutions per minute (r/min) in a ball milling device, obtaining $CsPbBr_3$ quantum dot. The method has advantages such as simple process, easy industrial production, no solvent, no organic ligand, low cost, and environmental protection. A quantum yield of product obtained by the method is up to 78%, and the product has a strong environmental stability. A preparation temperature of the product is low, and the reaction can be completed at a room temperature without a high temperature treatment.

5 Claims, 5 Drawing Sheets

(51) Int. Cl.
  *C01G 21/16*  (2006.01)
  *C08F 20/14*  (2006.01)
  *C08K 3/16*  (2006.01)
  *C09K 11/02*  (2006.01)
  *B82Y 20/00*  (2011.01)
  *B82Y 40/00*  (2011.01)
(52) U.S. Cl.
  CPC ................ *C08K 3/16* (2013.01); *C09K 11/02* (2013.01); *B82Y 20/00* (2013.01); *B82Y 40/00* (2013.01); *C01P 2002/34* (2013.01)

SOLVENT-FREE AND LIGAND-FREE BALL MILLING METHOD FOR PREPARATION OF CESIUM LEAD TRIBROMIDE QUANTUM DOT

TECHNICAL FIELD

The disclosure relates to a technical field of preparation of perovskite quantum dots (PQDs), in particular to a solvent-free and ligand-free ball milling method for preparation of cesium lead tribromide ($CsPbBr_3$) quantum dot.

BACKGROUND

In recent years, lead halide perovskite quantum dots ($APbX_3$ PQDs, A=one of cesium ion ($Cs^+$), methylamine ion ($MA^+$), and formamidine ion ($FA^+$); X=one of chloride ion ($Cl^-$), bromine ion ($Br^-$), and iodine ion ($I^-$)) have attracted attention and research of people owing to their excellent photoelectric properties. Compared to traditional II-VI groups inorganic semiconductor quantum dots (such as cadmium selenide (CdSe) and so on), the PQDs have advantages of wider tunable emission wavelength range, excellent photoelectric transmission performance, simple synthesis and low cost. It can be applied widely in light emitting diode (LED), solar cell, laser and other fields. However, its resistances to ultraviolet (UV) light, heat and water are poor in a long service, which limit its development.

At present, some literature has reported main preparation methods of the lead halide perovskite quantum dots are hot injection method, ligand-assisted reprecipitation method, in-situ preparation method, and so on. The hot injection method and the ligand-assisted reprecipitation method belong to the liquid phase synthesis method, and obtained products have a high quantum yield, but preparation and separation process are tedious and involve the use of solvents, especially worth mentioning the poor environmental stability of perovskite quantum dots prepared by these methods. The in-situ preparation method includes molten glass cooling annealing method (mentioned in Chinese Patent Publication No. CN109354059A) and solvent evaporation film-forming method, obtained products do not need to be separated and purified, however, preparation temperature of the molten glass cooling annealing method is high, the solvent evaporation film-forming method involves the use of solvents, and quantum yields of both the methods are low.

SUMMARY

In order to meet the above technical requirements, the disclosure provides a solvent-free and ligand-free ball milling method for preparation of $CsPbBr_3$ quantum dot, which effectively solves present problems such as cumbersome preparation process, difficult product separation, serious environmental pollution, poor stability and low quantum yields of products obtained by the prior art.

To achieve the above purpose, the disclosure adopts following technical schemes.

A solvent-free and ligand-free ball milling method for preparation of $CsPbBr_3$ quantum dot, including following steps:

mixing a Cs source, a Pb source, and a Br source as per a molar ratio of Cs source:Pb source:Br source being 1:1~6:1~9, and then adding polymethyl methacrylate (PMMA) to obtain a mixture; milling the mixture for 1~2 hours at a rotation speed of 360~630 revolutions per minute (r/min) in a ball milling device, and obtaining a product of $CsPbBr_3$ quantum dot.

In the above steps, the Cs source is one of cesium bromide (CsBr) and cesium stearate ($C_{18}H_{35}CsO_2$), the Pb source is one of lead bromide ($PbBr_2$) and lead stearate ($C_{36}H_{70}O_4Pb$), the Br source is potassium bromide (KBr).

In the above steps, a total mass of the Cs source, the Pb source, and the Br source accounts for 0.5%~2.5% of a total mass of the Cs source, the Pb source, the Br source and the PMMA.

Preferably, the Cs source is the $C_{18}H_{35}CsO_2$, the Pb source is the $PbBr_2$, and the Br source is the KBr.

Preferably, a molar ratio of $C_{18}H_{35}CsO_2$:$PbBr_2$:KBr is 1:4:7.

Preferably, the total mass of the Cs source, the Pb source, and the Br source accounts for 0.75% of the total mass of the Cs source, the Pb source, the Br source and the PMMA.

Preferably, the rotation speed of the ball milling device is 500 r/min.

Preferably, milling balls in the ball milling device are zirconia balls, and particle sizes of the zirconia balls are in a range of 2 mm~8 mm.

Compared with the prior art, beneficial effects of the disclosure are described below.

The disclosure adopts a solvent-free dry ball milling method to prepare the perovskite quantum dot. Through the solvent-free dry ball milling method, perovskite source materials generate the perovskite quantum dot by in-situ reaction inside a polymer matrix, and the generated perovskite quantum dot as a product is embedded in the polymer matrix, which has following advantages: (1) simple process and easy industrial production; (2) no solvent, no organic ligand, low cost and environmental protection; (3) a quantum yield of the product is up to 78%; (4) the product has a strong environmental stability, after being placed in air for a year, an emission intensity of the product has no attenuation; (5) a preparation temperature of the product is low, and the reaction can be completed at a room temperature without a high temperature treatment.

DETAILED DESCRIPTION OF EMBODIMENTS

The disclosure adopts a Cs source, a Pb source, and a Br source as a perovskite source, the Cs source is one of CsBr and $C_{18}H_{35}CsO_2$, the Pb source is one of $PbBr_2$ and $C_{36}H_{70}O_4Pb$, the Br source is KBr. Mixing the Cs source, the Pb source, and the Br source as per a molar ratio of Cs source:Pb source:Br source is 1:1~6:1~9, and then adding PMMA polymer material to obtain a mixture; in the mixture, a total mass of the Cs source, the Pb source, and the Br source accounts for 0.5%~2.5% of a total mass of the Cs source, the Pb source, the Br source and the PMMA. Preferably, the total mass of the Cs source, the Pb source, and the Br source accounts for 0.75% of the total mass of the Cs source, the Pb source, the Br source and the PMMA. Then milling the mixture for 1~2 hours at a rotation speed in a range of 360~630 r/min (also referred to as in a range of 360 r/min to 630 r/min) in a ball milling device, an obtained product is CsPbB3 quantum dot. Preferably, the rotation speed is 500 r/min and time for ball milling is 1 hour.

Preferably, the perovskite source consists of the $C_{18}H_{35}CsO_2$, the PbBr2, and the KBr; a molar ratio of $C_{18}H_{35}CsO_2$:$PbBr_2$:KBr is 1:4:7.

In a process of ball milling, milling balls in the ball milling device are zirconia balls, particle sizes of the zirconia balls are in a range of 2 mm~8 mm; Preferably, the particle sizes of the zirconia balls consist of 2 mm, 4 mm, and 8 mm.

Specific embodiments of the disclosure are provided below. It should be noted that the disclosure is not limited to the following specific embodiments, and any equivalent transformation based on the technical schemes of the present application should be within the protection scope of the disclosure.

Embodiment 1

The embodiment 1 adopts CsBr, $PbBr_2$, and KBr as perovskite sources, for each of the perovskite sources, a molar ratio of CsBr:$PbBr_2$:KBr is 1:1:3. Mixing the perovskite sources and PMMA polymer materials to obtain mixtures, and in each of the mixtures, mass of the perovskite source accounts for 1.5% of a total mass of the perovskite source and the PMMA polymer material. For each of the mixtures, performing the same operations as follow: adding the mixture into a 100 mL ball milling pot; then adding the zirconia balls with particle sizes consisting of 2 mm, 4 mm, and 8 mm into the ball milling pot; milling the mixture in a planetary ball milling device eventually. For the mixtures, rotation speeds for milling are 360 r/min, 500 r/min, and 600 r/min respectively, $CsPbBr_3$ PQDs/PMMA luminescent materials are obtained after the mixtures are milled for 1 hour respectively.

Figure 1:
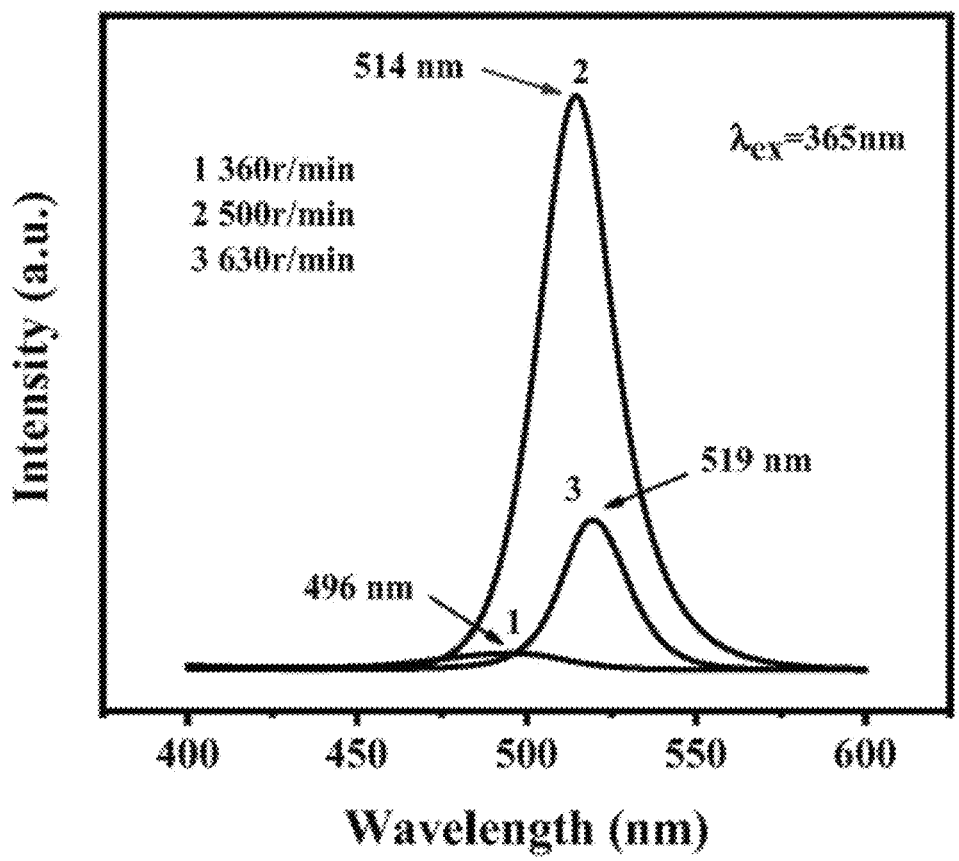
FIG. 1 is a fluorescence spectrum of products prepared with different ball milling rotation speeds in an embodiment 1.

Separating the zirconia balls and the luminescent materials, measuring each of the luminescent materials to obtain a fluorescence spectrum as shown in FIG. 1. As it shown in the FIG. 1, the fluorescence intensity of the luminescent materials is the strongest when the rotation speed for milling is 500 r/min.

Embodiment 2

The embodiment 2 adopts "CsBr+$PbBr_2$+KBr", "$C_{18}H_{35}CsO_2$+$PbBr_2$+KBr", "$C_{18}H_{35}CsO_2$+$C_{36}H_{70}O_4Pb$+KBr", and "cesium carbonate ($Cs_2CO_3$)+$PbBr_2$+KBr" as perovskite sources respectively, for each of the perovskite sources, a molar ratio of Cs source:Pb source:Br source is the same as that in the embodiment 1, that is, the molar ratio of Cs source:Pb source:Br source is 1:1:3; mass of the perovskite source is the same as that in the embodiment 1, that is, for each of the perovskite sources, the mass of the perovskite source accounts for 1.5% of a total mass of the perovskite source and the PMMA polymer material. A rotation speed for milling is 500 r/min and time for milling is 1 hour in the embodiment 2. $CsPbBr_3$ PQDs/PMMA luminescent materials are obtained eventually.

Figure 2:
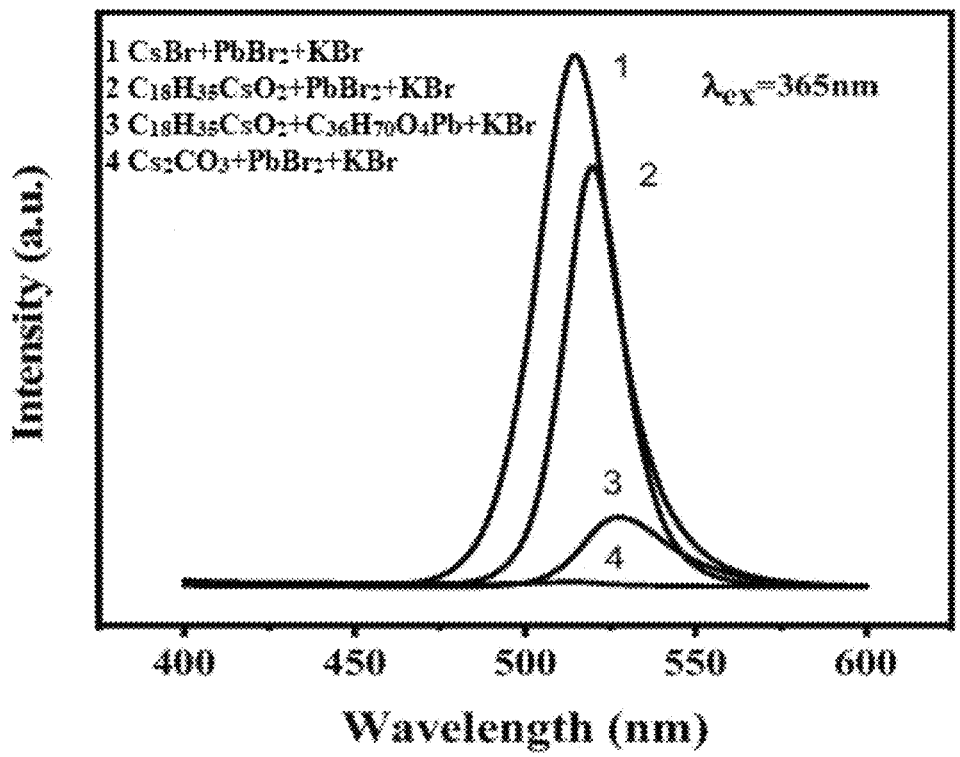
FIG. 2 is a fluorescence spectrum of products prepared with different perovskite sources in an embodiment 2.

Separating the zirconia balls and the luminescent materials, measuring each of the luminescent materials to obtain a fluorescence spectrum as shown in FIG. 2. As it shown in the FIG. 2, compared with the combination of "CsBr+$PbBr_2$+KBr", fluorescence intensity of the $CsPbBr_3$ PQDs/PMMA luminescent materials is weaker when the perovskite source is the combination of "$C_{18}H_{35}CsO_2$+$PbBr_2$+KBr"; however, its full width at a half-maximum is the narrowest, which is conducive to being used as a backlight display material. It can be seen that the combination of "$C_{18}H_{35}CsO_2$+$PbBr_2$+KBr" is the best perovskite source.

Embodiment 3

The embodiment 3 adopts $C_{18}H_{35}CsO_2$, $PbBr_2$, and KBr as perovskite sources, for each of the perovskite sources, a molar ratio of $C_{18}H_{35}CsO_2$:$PbBr_2$:KBr is 1:1:3. Mixing the perovskite sources and PMMA polymer materials to obtain mixtures respectively. In the mixtures, mass of the perovskite sources accounts for 0.5%, 0.75%, 1.0% and 1.25% of a total mass of the perovskite sources and the PMMA polymer materials respectively. For each of the mixtures, performing the same operations: adding the mixture into a 100 mL ball milling pot; then adding the zirconia balls with particle sizes consisting of 2 mm, 4 mm, and 8 mm into the ball milling pot; milling the mixture in a planetary ball milling device eventually, and a rotation speed for milling is 500 r/min. $CsPbBr_3$ PQDs/PMMA luminescent materials are after the mixtures are milled for 1 hour.

Figure 3:
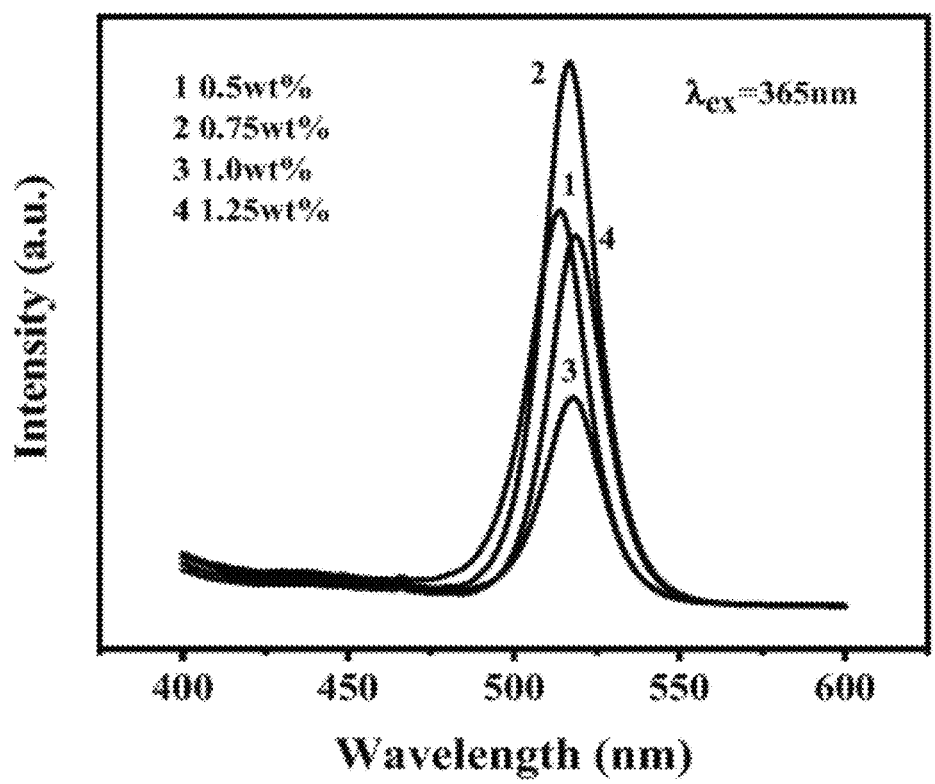
FIG. 3 is a fluorescence spectrum of products prepared with mass ratios of different perovskite sources in an embodiment 3.

Separating the zirconia balls and the luminescent materials, measuring the luminescent materials to obtain a fluorescence spectrum as shown in FIG. 3. As it shown in the FIG. 3, as the mass of the perovskite source increases, the fluorescence intensity of the luminescent material increases first and then decreases. When the mass of the perovskite source accounts for 0.75% of the total mass of the perovskite source and the PMMA polymer material, the fluorescence intensity of the luminescent material is the strongest.

Embodiment 4

The embodiment 4 adopts $C_{18}H_{35}CsO_2$, $PbBr_2$, and KBr as perovskite sources, molar ratios of $C_{18}H_{35}CsO_2$:$PbBr_2$:KBr are 1:1:3, 1:2:3, 1:3:3, 1:4:3, 1:5:3, and 1:6:3 respectively. For each of the perovskite sources, performing the same operations: mixing the perovskite source and PMMA polymer material to obtain a mixture; in the mixture, mass of the perovskite source accounts for 0.75% of a total mass of the perovskite source and PMMA polymer material; adding the mixture into a 100 mL ball milling pot; then adding the zirconia balls with particle sizes consisting of 2 mm, 4 mm, and 8 mm into the ball milling pot; milling the mixture in a planetary ball milling device eventually, and a rotation speed for milling is 500 r/min. $CsPbBr_3$ PQDs/PMMA luminescent materials are obtained after the mixtures are milled for 1 hour.

Figure 4:
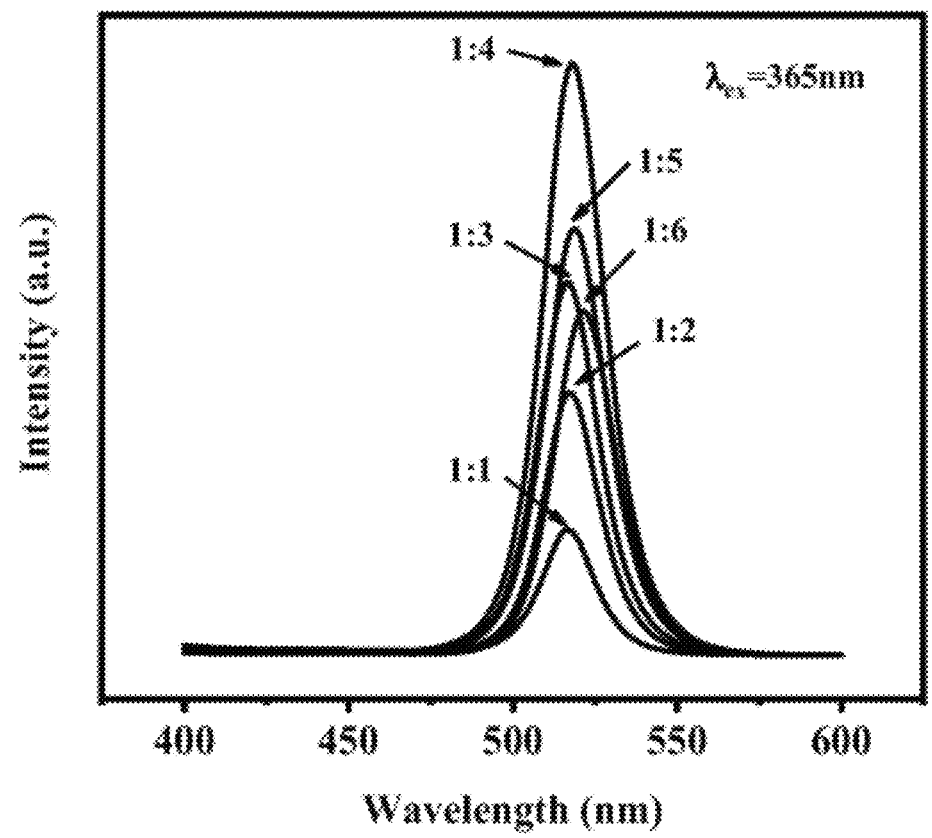
FIG. 4 is a fluorescence spectrum of products prepared with different molar ratios of $C_{18}H_{35}CsO_2$ and $PbBr_2$ in an embodiment 4.

Separating the zirconia balls and the luminescent materials, measuring the luminescent materials to obtain a fluorescence spectrum as shown in FIG. 4. As it shown in the FIG. 4, as the molar ratio of the $PbBr_2$ increases, the fluorescence intensity of the luminescent materials increases first and then decreases. When the molar ratio of $C_{18}H_{35}CsO_2$:$PbBr_2$ is 1:4, the fluorescence intensity of the luminescent material is the strongest.

Embodiment 5

The embodiment 5 adopts $C_{18}H_{35}CsO_2$, $PbBr_2$, and KBr as perovskite sources, molar ratios of $C_{18}H_{35}CsO_2$:$PbBr_2$:KBr are 1:1:1, 1:1:2, 1:1:3, 1:1:4, 1:1:5, 1:1:6, 1:1:7, 1:1:8, and 1:1:9 respectively. For each of the perovskite sources, performing the same operations: mixing the perovskite source and PMMA polymer material to obtain a mixture; in the mixture, mass of the perovskite source accounts for 0.75% of a total mass of the perovskite source and PMMA polymer material; adding the mixture into a 100 mL ball milling pot, then adding the zirconia balls with particle sizes consisting of 2 mm, 4 mm, and 8 mm into the ball milling pot; milling the mixture in a planetary ball milling device eventually, and a rotation speed for milling is 500 r/min. $CsPbBr_3$ PQDs/PMMA luminescent materials are obtained after the mixtures are milled for 1 hour.

Figure 5:
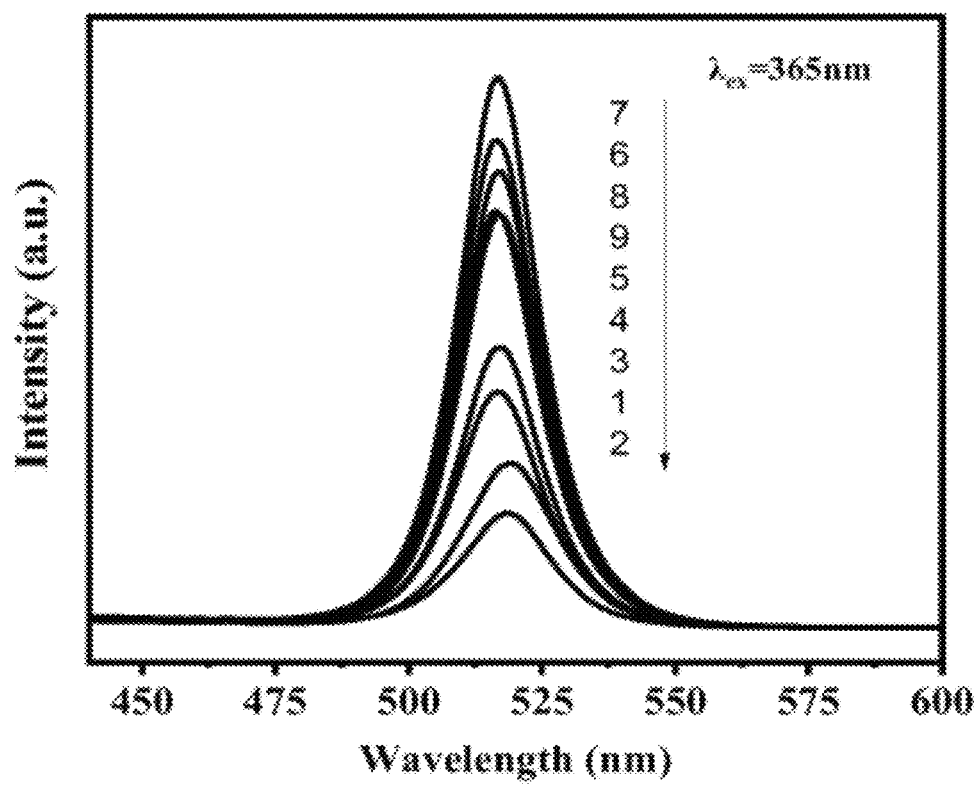
FIG. 5 is a fluorescence spectrum of products prepared with different molar ratios of $C_{18}H_{35}CsO_2$ and KBr in an embodiment 5.

Separating the zirconia balls and the luminescent materials, measuring the luminescent materials to obtain a fluorescence spectrum as shown in FIG. 5. As it shown in the FIG. 5, as the molar ratio of the KBr increases, the fluorescence intensity of the luminescent materials increases first and then decreases. When the molar ratio of $C_{18}H_{35}CsO_2$:KBr is 1:7, the fluorescence intensity of the luminescent materials is the strongest.

Embodiment 6

The embodiment 6 adopts $C_{18}H_{35}CsO_2$, $PbBr_2$, and KBr as perovskite sources, molar ratios of $C_{18}H_{35}CsO_2$:$PbBr_2$:KBr are 1:X:Y, X=1, 4; Y=3, 6, 7. For each of the perovskite sources, performing the same operations: mixing the perovskite source and PMMA polymer material to obtain a mixture; in the mixture, mass of the perovskite source accounts for 0.75% of a total mass of the perovskite source and PMMA polymer material; adding the mixture into a 100 mL ball milling pot, then adding the zirconia balls with particle sizes consisting of 2 mm, 4 mm, and 8 mm into the ball milling pot; milling the mixture in a planetary ball milling device eventually, and a rotation speed for milling is 500 r/min. $CsPbBr_3$ PQDs/PMMA luminescent materials are obtained after the mixtures are milled for 1 hour.

Figure 6:
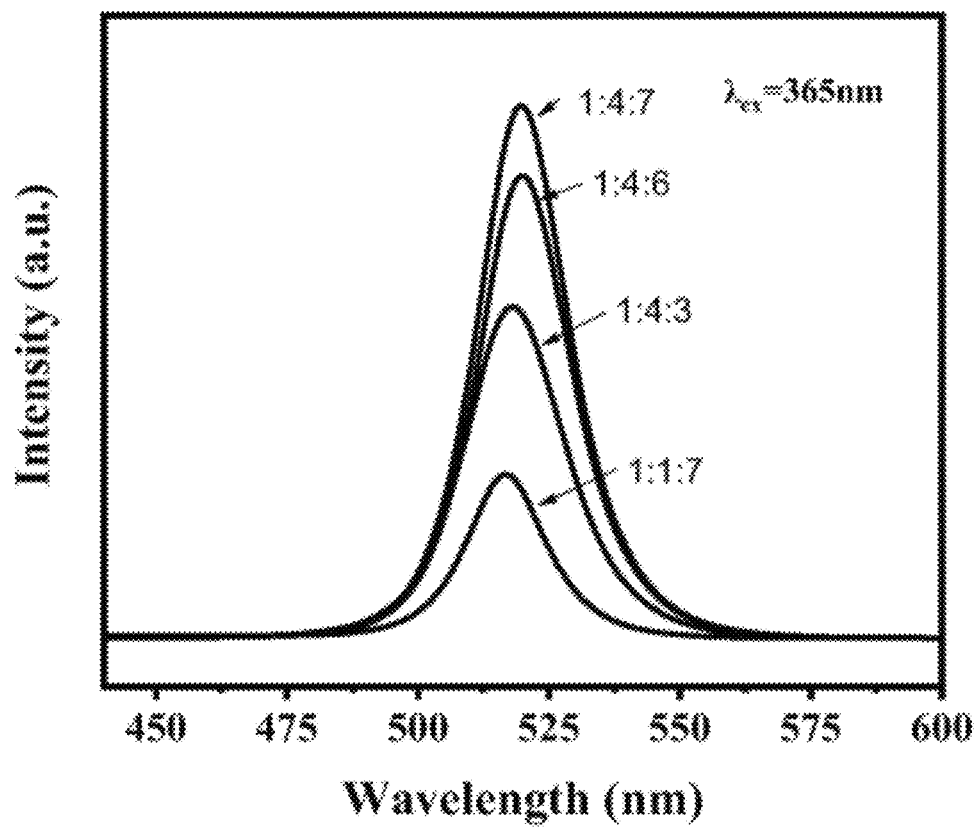
FIG. 6 is a fluorescence spectrum of products prepared with different molar ratios of $C_{18}H_{35}CsO_2$, $PbBr_2$ and KBr in an embodiment 6.

Separating the zirconia balls and the luminescent materials, measuring the luminescent materials to obtain a fluorescence spectrum as shown in FIG. 6. As it shown in the FIG. 6, when the molar ratio of $C_{18}H_{35}CsO_2$:$PbBr_2$:KBr is 1:4:7, the fluorescence intensity of the luminescent materials is the strongest.

Embodiment 7

The embodiment 7 adopts $C_{18}H_{35}CsO_2$, $PbBr_2$, and KBr as a perovskite source, a molar ratio of $C_{18}H_{35}CsO_2$:$PbBr_2$:KBr is 1:4:7. Mixing the perovskite source and PMMA polymer material to obtain a mixture, mass of the perovskite source accounts for 0.75% of a total mass of the perovskite source and PMMA polymer material; adding the mixture into a 100 mL ball milling pot, then adding the zirconia balls with particle sizes consisting of 2 mm, 4 mm, and 8 mm into the ball milling pot; milling the mixture in a planetary ball milling device eventually. A rotation speed for milling is 500 r/min; $CsPbBr_3$ PQDs/PMMA luminescent material is obtained after the mixture is milled for 1 hour.

Figure 7:
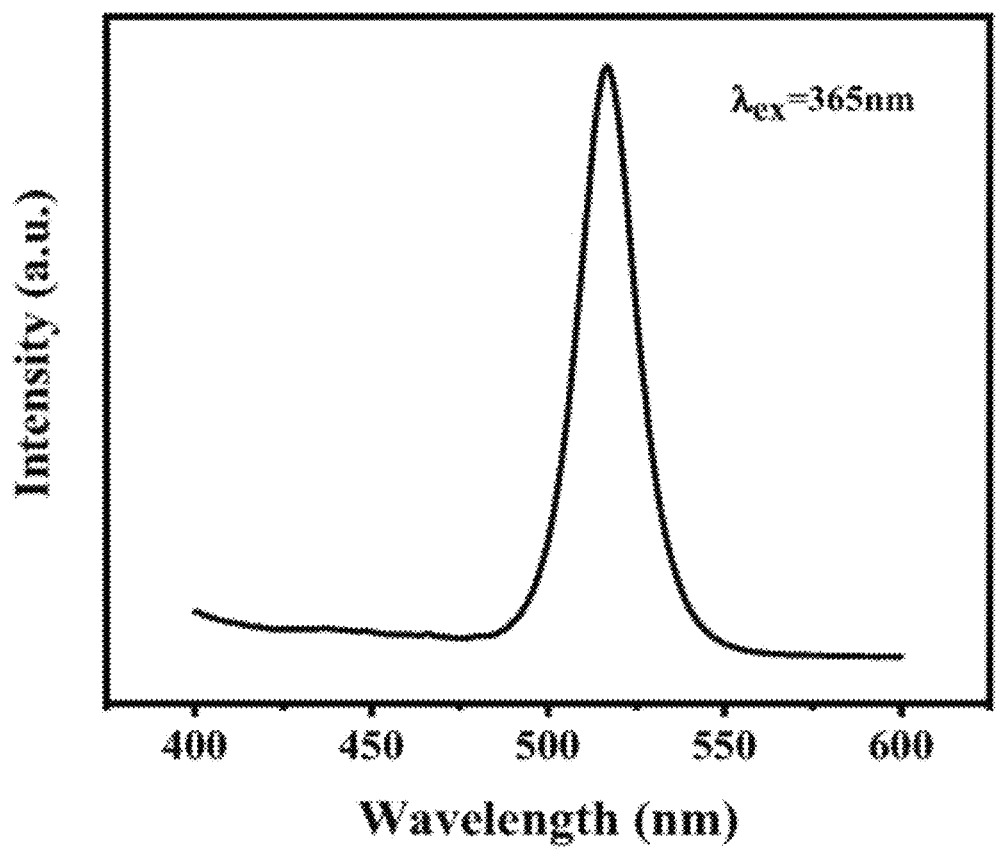
FIG. 7 is a fluorescence spectrum of a product prepared in an embodiment 7.
Figure 8:
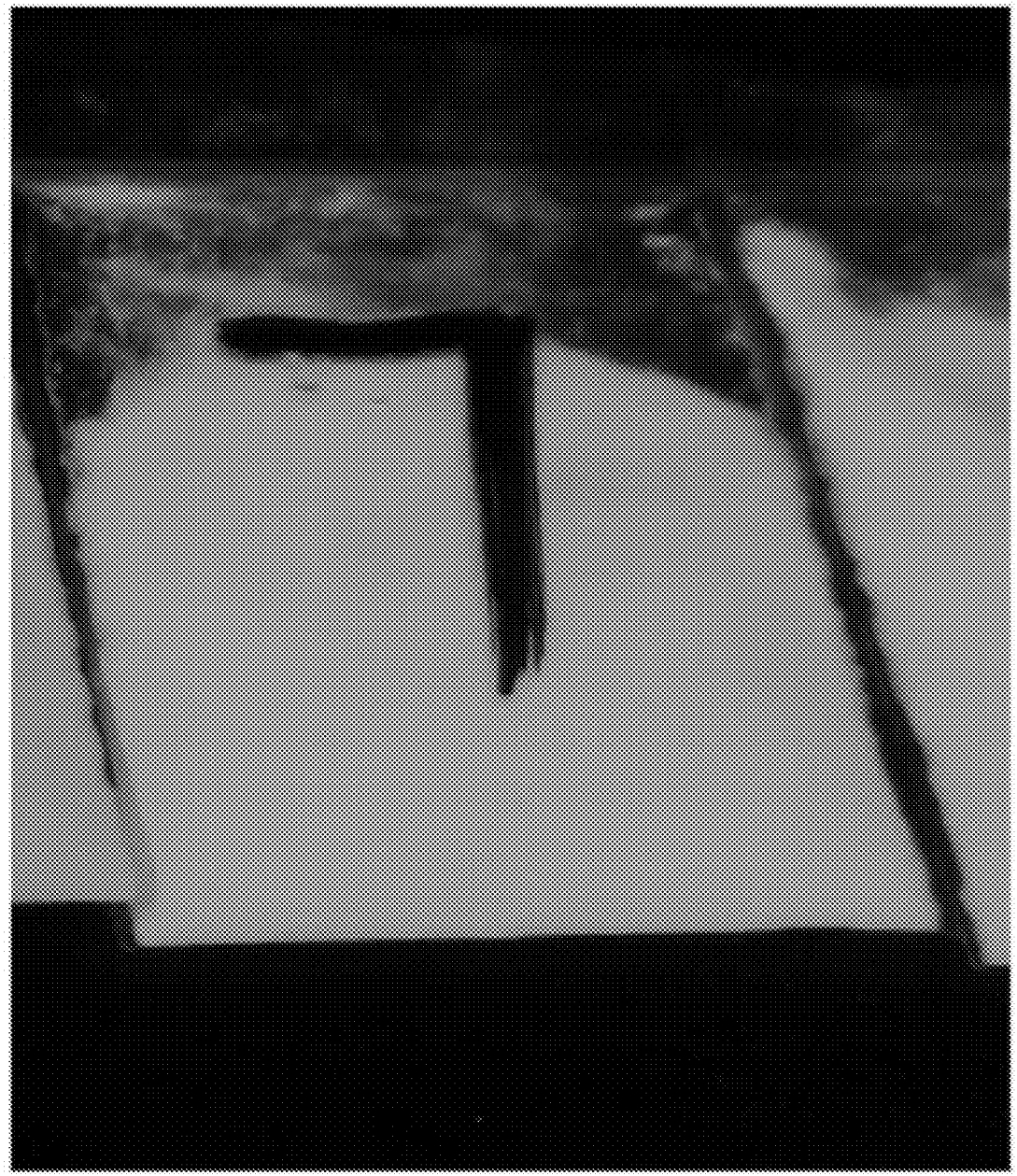
FIG. 8 shows a photograph of the product prepared in the embodiment 7 under an UV lamp of 365 nm.

Separating the zirconia balls and the luminescent material, measuring the luminescent material to obtain a fluorescence spectrum as shown in FIG. 7. As it shown in the FIG. 7, a half-peak width of the fluorescence spectrum of the luminescent material is 20.2 nm. A photograph of the luminescent material under the 365 nm UV lamp is shown in FIG. 8, which shows that luminescent performance of the luminescent material is good.

What is claimed is:

1. A solvent-free and ligand-free ball milling method for preparation of cesium lead tribromide ($CsPbBr_3$) quantum dot, comprising:

mixing a Cs source, a Pb source, and a Br source as per a molar ratio of Cs source:Pb source:Br source, and then adding polymethyl methacrylate (PMMA) to obtain a mixture; milling the mixture for 1 to 2 hours at a rotation speed in a range of 360 to 630 revolutions per minute (r/min) in a ball milling device, and obtaining a product of $CsPbB_3$ quantum dot;

wherein the Cs source is cesium stearate ($C_{18}H_{35}CsO_2$), the Pb source is lead bromide ($PbBr_2$), and the Br source is potassium bromide (KBr);

wherein a total mass of the Cs source, the Pb source, and the Br source accounts for 0.5% to 2.5% of a total mass of the Cs source, the Pb source, the Br source and the PMMA;

wherein the molar ratio of the $C_{18}H_{35}CsO_2$:the $PbBr_2$:the KBr is 1:4:7; and wherein milling balls in the ball milling device are zirconia balls, and particle sizes of the zirconia balls comprise 2 mm, 4 mm and 8 mm.

2. The solvent-free and ligand-free ball milling method for preparation of $CsPbBr_3$ quantum dot according to claim 1, wherein the total mass of the Cs source, the Pb source, and the Br source accounts for 0.75% of the total mass of the Cs source, the Pb source, the Br source and the PMMA.

3. The solvent-free and ligand-free ball milling method for preparation of $CsPbBr_3$ quantum dot according to claim 1, wherein the rotation speed for milling is 500 r/min.

4. The solvent-free and ligand-free ball milling method for preparation of $CsPbBr_3$ quantum dot according to claim 3, wherein the mixture is milled for 1 hour.

5. A solvent-free and ligand-free ball milling method for preparation of $CsPbBr_3$ quantum dot, comprising:

mixing $C_{18}H_{35}CsO_2$, $PbBr_2$, and KBr as per a molar ratio of the $C_{18}H_{35}CsO_2$:the $PbBr_2$:the KBr being 1:4:7, and then adding PMMA to obtain a mixture; milling the mixture for 1 hour at a rotation speed of 500 r/min in a ball milling device with zirconia balls, and obtaining a product of $CsPbB_3$ quantum dot; and wherein a total mass of the $C_{18}H_{35}CsO_2$, the $PbBr_2$, and the KBr accounts for 0.75 of a total mass of the $C_{18}H_{35}CsO_2$, the $PbBr_2$, the KBr and the PMMA; and particle sizes of the zirconia balls comprise 2 mm, 4 mm and 8 mm.

* * * * *